United States Patent [19]

Larson et al.

[11] Patent Number: 4,723,242

[45] Date of Patent: Feb. 2, 1988

[54] DIGITAL ADAPTIVE VOTING

[75] Inventors: Brian R. Larson, Inver Grove Heights; Donald B. Bennett, Burnsville; Thomas O. Wolff, Fridley, all of Minn.

[73] Assignee: Sperry Corporation, Blue Bell, Pa.

[21] Appl. No.: 879,695

[22] Filed: Jun. 27, 1986

[51] Int. Cl.$^4$ .............................................. G06F 11/18
[52] U.S. Cl. ...................................................... 371/36
[58] Field of Search ..................... 371/36, 68; 307/464

[56]  References Cited

U.S. PATENT DOCUMENTS

| | | | |
|---|---|---|---|
| 3,544,778 | 12/1970 | Masters, Jr. ...................... | 371/36 X |
| 3,646,329 | 2/1972 | Yoshino et al. ..................... | 307/464 |
| 3,681,578 | 8/1972 | Stevens ................................ | 371/36 |
| 3,783,250 | 1/1974 | Fletcher et al. ..................... | 371/36 |
| 3,848,116 | 11/1974 | Moder et al. ........................ | 371/36 |
| 4,015,246 | 3/1977 | Hopkins et al. .................... | 364/200 |
| 4,225,961 | 9/1980 | Raggenbass et al. ............... | 371/36 |
| 4,326,291 | 4/1982 | Marsh et al. ........................ | 371/68 |
| 4,342,083 | 7/1982 | Freedman et al. .................. | 364/200 |
| 4,356,546 | 10/1982 | Whiteside et al. .................. | 364/200 |
| 4,375,863 | 3/1983 | Wensley .............................. | 371/36 |
| 4,403,333 | 9/1983 | Gupta ................................... | 371/36 |
| 4,551,814 | 11/1985 | Moore et al. ........................ | 364/716 |
| 4,551,815 | 11/1985 | Moore et al. ........................ | 364/716 |
| 4,562,575 | 12/1985 | Townsend ........................... | 371/36 X |
| 4,570,261 | 2/1986 | Maher .................................. | 371/16 |
| 4,583,224 | 4/1986 | Ishii et al. ............................ | 371/36 |
| 4,593,396 | 6/1986 | Anderson, Jr. ...................... | 371/68 |
| 4,617,475 | 10/1986 | Reinschmidt ....................... | 307/464 X |

OTHER PUBLICATIONS

Adaptive Decision Elements in Failure-Tolerant Computer Design, *William H. Pierce*, Academis Press, 1965, Chapter IV, pp. 50-71.

Siewiorek and Swarz, The Theory and Practice of Reliable System Design, 1982, pp. 149-154.

*Primary Examiner*—Charles E. Atkinson
*Attorney, Agent, or Firm*—Glenn W. Bowen; Laurence J. Marhoefer

[57]  ABSTRACT

A digital system employing adaptive voting circuitry to improve its fault-tolerance receives an input data bit from each of a number of input data sources. The adaptive voting circuitry has a separate section for each of the input devices which has a weight register that stores an initial weight value which determines the voting strength of the associated input device. The weight values are multiplexed through to a voting circuit which also receives the input data bits. If an input data bit is a logic "1" the weight value of the input data device that supplied this "1" signal is added to the weight values of all other input data devices that supplied "1" data bits. If the data bit from a particular input device is a logic "0", then its weight is added to the weight values for other input data devices which supplied logic "0". Accumulative voting then takes place via adders in the voting circuit which determines whether the correct output bit should be a logic "1" or a logic "0". After the correct output bit is obtained, it is compared with the input bits supplied by the different input data devices, and the stoned weight values associated with each of these are decremented if the input device supplied a data bit that did not conform to the correct output bit, or alternately they are incremented if it did.

20 Claims, 6 Drawing Figures

DIGITAL ADAPTIVE VOTING

BACKGROUND OF THE INVENTION

Field of the Invention

The present invention relates to digital adaptive voting for fault-tolerant digital systems.

The adaptive voting technique of the present invention uses dynamically gathered error data to differentiate good units from failing units in a redundant electronic system. Adaptive voting produces statistically more correct results than majority voting for redundant systems.

Adaptive voting is mathematically demonstrable to be a superior form of fault-tolerant voting for n units of an n-modular redundant system in the fact of widespread and frequent failures within multiple units of such a system. In other words, in the face of very serious performance degradations of multiple units of the system, adaptive voting may maintain system functionality even when all units of the system are suffering from intermittent faults. This is particularly advantageous for n-modular redundant Very Large Scale Integrated (VLSI) circuit technology.

A prior art treatise on adaptive voting is contained as Chapter IV, Adaptive Decision Elements in Failure-Tolerant Computer Design by William H. Pierce published by *Academic Press*, 1965. The adaptation procedures taught therein are entirely analog in nature. For example, the simplest adaption procedure is a procedure in which the error probability of the output of a circuit is inferred from conditions in the circuit, such as bias current. The quantity that indicates the error probability of the output of the circuit is used directly to set the vote-weight of the output in all later vote-takers. This is an open-loop adaption procedure, so it is stable and requires no special analysis. Other adaptation methods include linear-feedback circuits, linear low-pass filters and, as shown in pages 149-154 of the book entitled "The Theory and Practice of Reliable System Design", 1982, by Daniel P. Siewiorek and Robert S. Swarz, Digital Equipment Corporation, self-purging redundancy.

DESCRIPTION OF THE INVENTION

Figure 1:
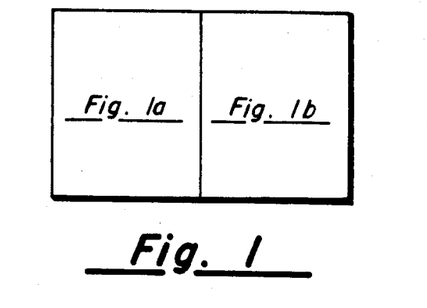
FIG. 1, comprised of FIGS. 1a and 1b, is a block diagram of a first embodiment of the present invention.
Figure 1A:
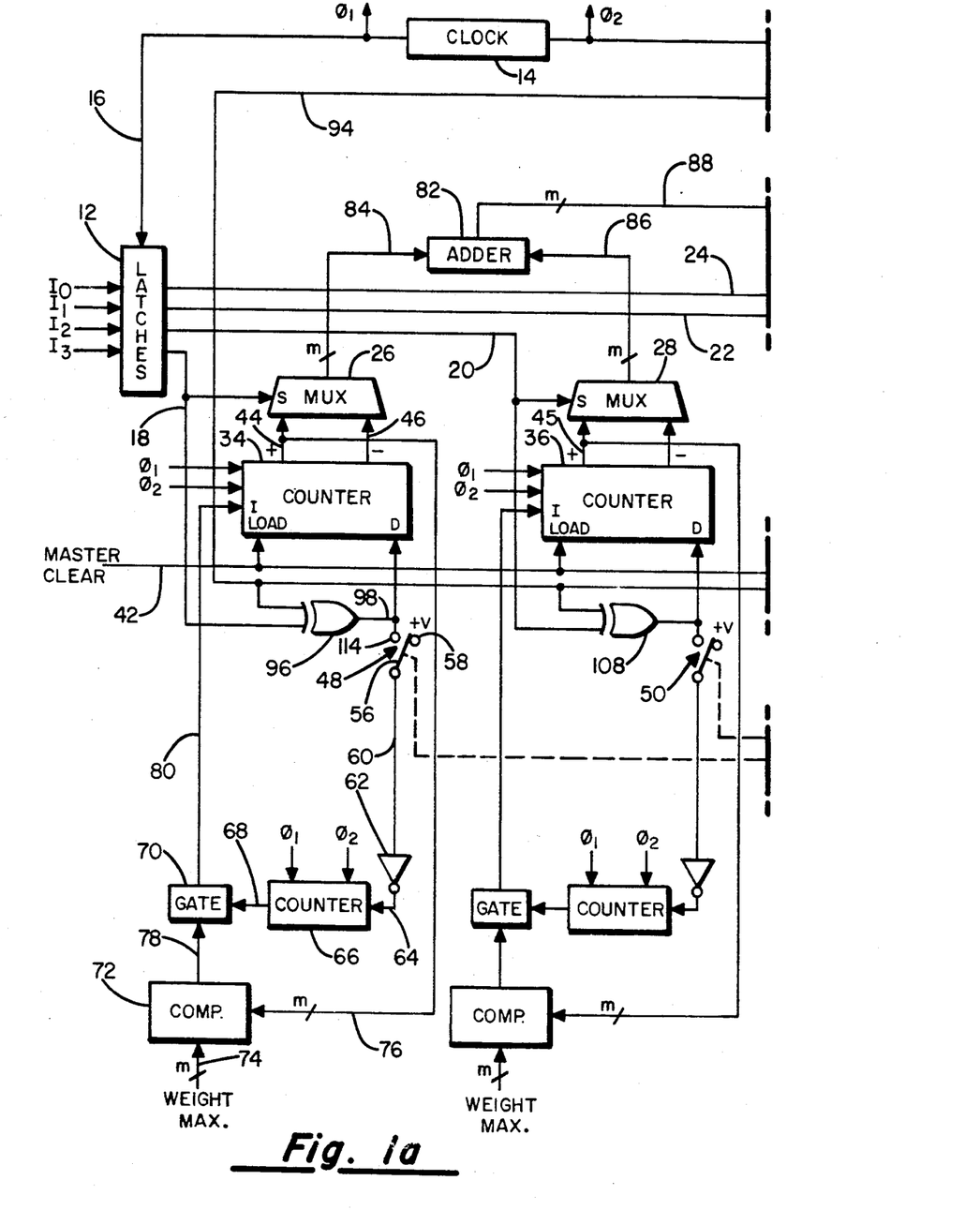
Figure 1B:
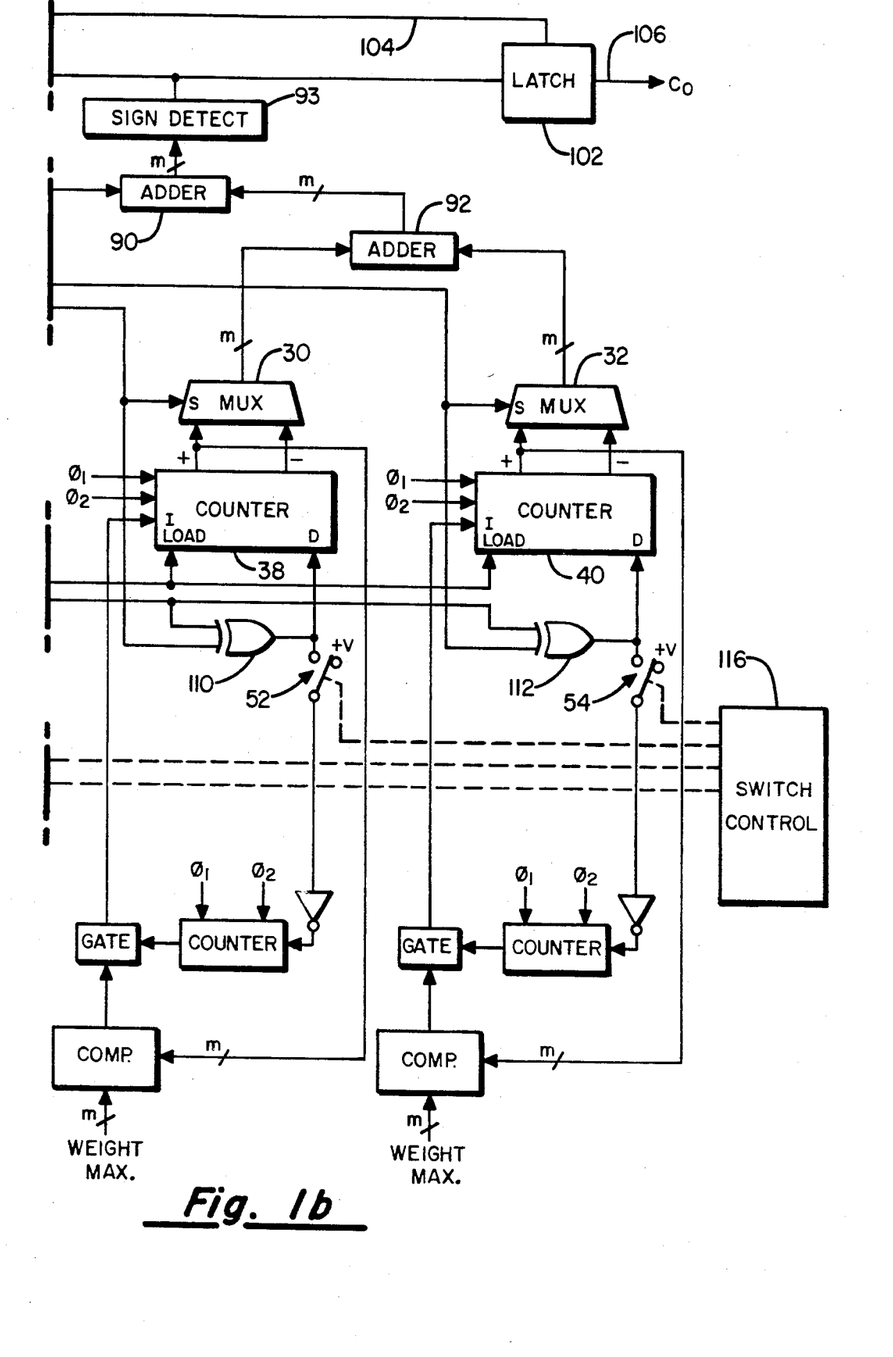

The present invention is described by reference to the drawings. FIG. 1 illustrates the manner in which FIGS. 1a and 1b are to be positioned to form a block diagram of a first embodiment of the present invention. For purposes of illustration the embodiment of FIG. 1a and 1b are implemented with four redundant input data devices (not shown). The four redundant hardware devices operate on data supplied from a data source, and each produces a single output bit. For example, the input signals $I_0$–$I_3$ are each representative of a single data bit from each of the input devices. These bits are stored in latches 12 and a two-phase clock supply 14 is provided so that the stored bits in the latches 12 are coupled out on the lines 18, 20, 22, 24 upon the occurrence of a phase one clock signal on the line 16. The signals on the lines 18, 20, 22, 24 are used as select signals for the multiplexers 26, 28, 30, 32 respectively. Voting weight values stored in the counters 34–40 are selectively coupled through these multiplexers under the control of the bits clocked from the latches 12.

The values stored in the counters 34–40 are initialized upon the occurrence of a Master Clear signal on the line 42 which is coupled to the LOAD terminals of the counters 34–40. The values stored in the counters correspond to predetermined maximum weight value. In the illustrated embodiment of the weights stored on all the counters are initially equal after the occurrence of the Master Clear Signal. However, it is within the scope of the present invention to provide different weights for each of the counters in accordance with the fault-tolerance conditions that are to be implemented in any particular installation.

The counters 34–40 are up/down counters which have both Increment (I) and Decrement (D) input terminals. These counters provide a digital number representative of the stored weight value in 1's compliment form and also the inverted value of the 1's compliment number. The line 44, labeled with a "+", is coupled from the counter 34 to the multiplexer 26 and represents a multiple bit bus. This line carries a positive value representation of the 1's compliment number that represents the weight assigned to the counter 34 upon initialization. In 1's compliment number notation a number is positive (or zero) if its most significant bit is "0". The line 46 labeled with a "—" supplies the inverted value of the 1's compliment number which means that all of the logic "1" values of the number are converted to logic "0" values, and all of the logic "0" values supplied on the bus 44 are converted to logic "1" values. Thus, since the value of the numbers applied on the line 46 will be a negative number, the most significant bit of this number is a logic "1".

In the description of this invention it is first assumed that the switches 48-54 are in the position shown in the FIG. 1a and 1b wherein the contact blades, such as the blade 56 are connected between the positive voltage terminal 58 and the input line 60 to an inverter 62. The application of a positive voltage to the input of the inverter 62 drives the output of the inverter on the line 64 to the input of the counter 66 to a LOW state. This disables the counter 66 from changing its counts, but provides a constant enabling signal on the line 68 to the gate 70 so that the gate is permanently open when the switch 48 is in the position shown. A comparator 72 is provided which compares a multi-bit digital signal of "m" bits on the bus lines 74 which may be obtained from storage, and which signifies the initial voting weight assigned to the device coupled to input line 239. An "m" bit signal is also supplied on the bus lines 76 from the 1's compliment output of the counter 34 on the lines 44. When the two signals on the lines 74 and 76 are equal the gate 70 is disabled by the signal on the line 78. When they are unequal a signal is supplied by the gate 70 to the line 80 to increment, or I input terminal, on the counter 34. Thus upon initialization of the counters with the Master Clear signal on the line 42, further incrementing of the counter 34 will not occur until after the counter has first been decremented when the switch 48 is open.

In describing the operation of the embodiment depicted in FIGS. 1a and 1b it will first be assumed that the input signals $I_0$–$I_3$ are all identical, meaning that all of the redundant hardware devices are producing the same result and, thereby, it can be presumed they are all operating correctly and are not subject to faults. In this instance all of the multiplexers 26–32 are controlled by the corresponding select signals on the lines 18–24, so that they transfer the count stored in them to the adder that is coupled to the associated multiplexer. For example, the adder 82 is connected to receive an "m" bit wide signal from the multiplexer 26 on bus 84, and a corresponding signal from the multiplexer 28 on bus 86. The adder 82 provides a 1's compliment addition of these two signals and provides an "m" bit wide signal on the bus 88 to another adder 90.

In a corresponding manner the multiplexers 30 and 32 are coupled to the adder 92, the output of which is coupled to the adder 90. If the signal on the lines $I_0$ is in a logic "1" state, the 1's compliment a number on the lines 44 is supplied to the associated multiplexer such as the multiplexer 26. Assuming, therefore that all of the input data signals $I_0$–$I_3$ stored in the latches 12 are at a logic "1" level all of the multiplexers 26–32 will supply a positive weight value to the adders 82 and 92. Therefore, when these numbers are added by the adder 90, they will provide a signal at the output of the sign detect circuit 93 which indicates whether the most significant bit of the 1's compliment number is a logic "0" or a logic "1" and inverting it. The sign detect circuit 93 feed back this logic "1" or logic "0" signal on the line 94 to one input of each of the exclusive-or gates 96, 108, 110, 112. The other input of each of these exclusive-or gates 96, 108, 110, 112, is coupled to the corresponding multiplexer selection lines, such as the line 18.

Assuming that all of the weights of the counters 34–40 are set to the same initial weight value, the sum provided by the adder 90 will be at a maximum value, and will maintain this value, as long as all of the input data signals $I_0$–$I_3$ continue to agree. If any of the input signals $I_0$–$I_3$ happen to be at a logic "0" level instead of a logic "1" level, the inverted values of these counters will be sent out on the bus lines 46. For example, assuming that all of the input signals $I_0$–$I_3$ are at a logic "0" level, the adders 82 and 92 will then supply negative weight values, and these will be added by the adder 90 to supply a negative value, or logic "0" output from the sign detect circuit 93. Since both of the inputs to the exclusive-or gate 96 in this case are at a logic "0" level, the exclusive-or gate 96 will not produce an output to the output line 98, which is coupled to the decrement (D) input terminal of the counter 34. Thus in case of agreement, when the inputs to the exclusive-or gates are both at either a "1" or a "0" level, the associated counter will remain at its previous weight value. The sign detect circuit 93 is also coupled on the line 100 to a latch 102 which is supplied to a phase two clock pulse on the line 104 from the clock circuit 14. The output of the latch 102 that is supplied on the line 106 is designated a "$C_0$" signal. This one bit signal will be either a logic "1" or a logic "0" in accordance with the sign detected by the sign detect circuit 93, but it will appear one clock cycle following the latching of the signal into the latch 102.

Assuming that line $I_0$ is at a logic "0" level while the lines $I_1$, $I_2$ and $I_3$ are on a logic "1" level, the inverted, or bit-by-bit complemented, value of the counter 34 that is supplied on the line 46 and, via the multiplexer 26, to the line 84 will be subtracted from the positive 1's compliment signal that is supplied by the counter 36 on the line 45 and, via the multiplexer 28, to the line 86. The 1's compliment signals from the multiplexers 30 and 32 and the counters 38 and 40 are correspondingly sent to the adder 92, and from this adder to the adder 90. Since the counts in the counters 34–40 may be different, there is a summed weight value that is provided by the adder 90 that determines the sign of the final value, and thus whether the value is negative or positive.

It is possible that the weights of three counters, for example the counters 36, 38 and 40, may all be positive but of a lower value than the inverted negative weight value stored in a single counter, for example, the counter 34. Even though there are three counters that indicate a positive 1's compliment signal in this instance the inverted value stored in the counter 34 can exceed the sum of the other values, and the sign detect circuit 93 would then provide a negative output or a logic "0" output signal. In this event even though the sign detect circuit 93 provides a logic "0" output on the line 94 to the exclusive-or gate 96 and that the signal on the line 18 also at a logic "0" level, and the exclusive-or gate 96 still will not provide a decrement count to the counter 34. However, the other corresponding exclusive-or gates 108, 110 and 112 associated with the counters 36, 38 and 40 respectively, would provide decrement counts to the D inputs of these counters.

In a similar manner, if all of the input signals $I_0$–$I_3$ except one were at a logic "0" level, the sum provided by the adder 90 would determine whether or not the addition of the weights resulted in a positive or a negative value, and an appropriate signal would be fed back. In the event that the number of "1" and "0" signals on the inputs were equal and the weights of the counters were all equal, either a logic "0" or a logic "1" signal may be provided by the sign detect circuit 93 on the line 94, as desired. Usually this signal is assumed to be a "1" for ease and speed of decoding, since a zero value has a zero most significant bit, as do positive numbers.

If the switches 48–54 are switched to their opposite positions, or their closed positions, the operation of the circuit is modified. For example, if the blade on 56 of the switch 48 is in contact with the terminal 114, the output from the exclusive-or gate 96 will be supplied on the line 60 to the input inverter 62. The two-clock phases from the clock 14 is supplied to the counter 66, and each time that a signal appears on the line 60 the signal will be clocked into the counter, and when the counter 66 is full a signal will be supplied to the gate on the line 68. The gate 70 is now controlled so that it is opened only after a predetermined number of agreements have occurred between the signal supplied on the line 94 by the sign detect circuit 93, (which is indicative of the total weight of the counters summed together), and the data signal on the corresponding input line $I_0$. The counter 34 will not, therefore, begin to increment until after a predetermined number of agreements have occurred, equal to a number of stages in the counter 66. This embodiment allows a monitored unit to regain voting weight once it has begun to agree with the majority of the voting units. The setting of the switches 48–54 is controlled by a switch control unit 116.

Figure 2:
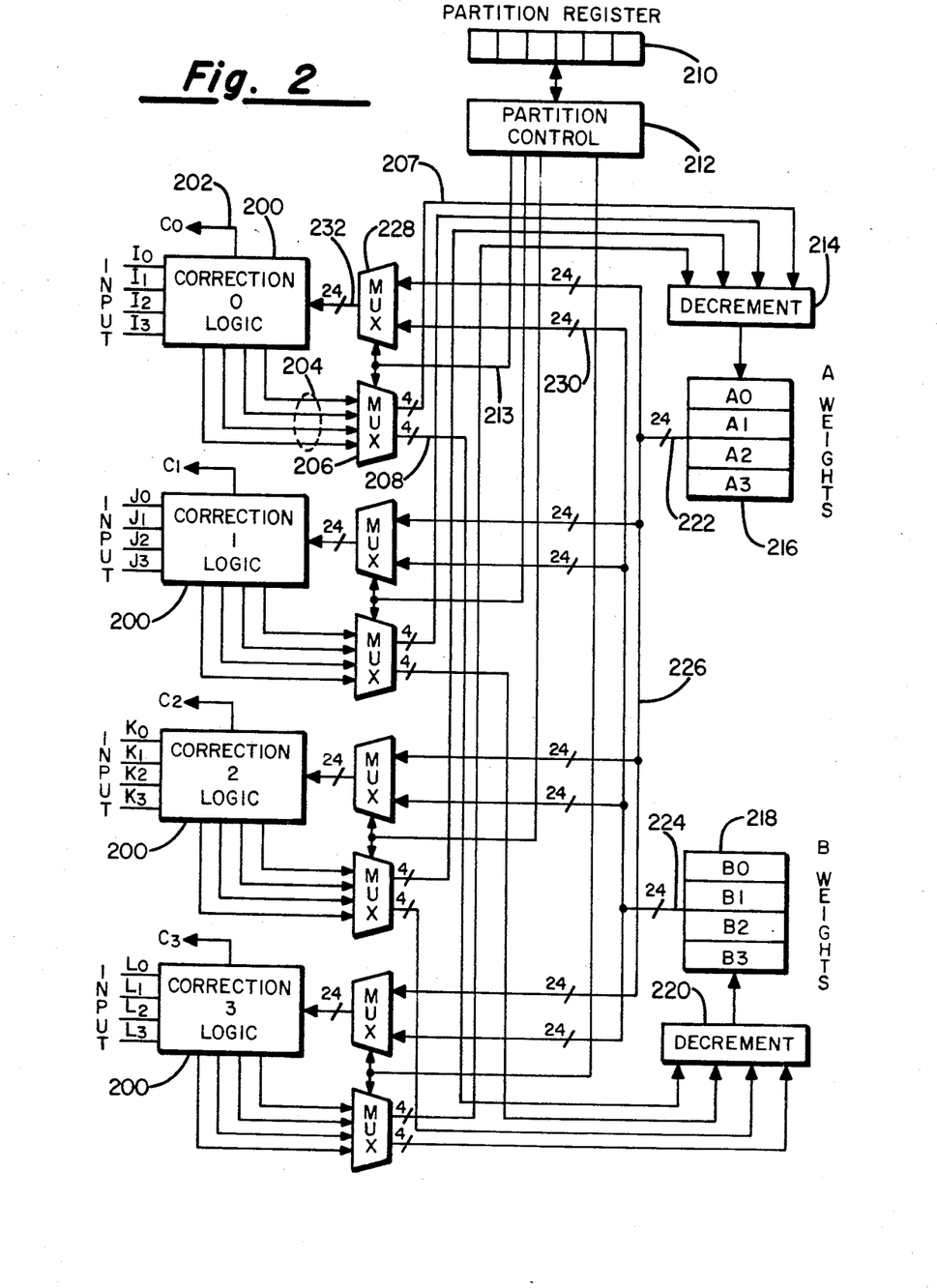
FIG. 2 is an alternate embodiment of the present invention.

FIG. 2 is an alternate embodiment for which a number of correction logic circuits 200 are employed, wherein each of the correction logic circuits is constructed in a manner similar to that described with reference to FIGS. 1a and 1b. In this embodiment, however, each of the data input sources supplies more than one data input. For example, a single data input source supplies the $I_0$, $J_0$, $K_0$, and $L_0$ data inputs. Each of these inputs goes to a separate correction logic circuit and the output of each of the correction logic circuits is an individual output count such as the $C_0$ count on the line 202. Decrementing signals corresponding to those found on the line 98 from the exclusive-or gate 96 of FIG. 1a, are supplied on the lines 204 to a multiplexer such as a multiplexer 206, which provide outputs that are 4 bits wide. These outputs are supplied either on the line 207 or on the line 208 in accordance with the setting of the partition register 210, and under the control of the partition control 212 via the control line 213.

If a fault occurs, and the line 207, for example, is selected to be active by the partition control 212 the signal on this line is coupled to a decrement counting section, consisting of four separate decrement counters 214 which are coupled to the $\overline{A}$ weight storage control section 216. On the other hand, if the line 208 is selected to be active, the $\overline{B}$ weight section 218 which is controlled by the decrement counters 220 is employed. In this manner, alternate sets of weighted values may be selected by multiplexers such as the multiplexer 206 as associated with individual input data bits.

In the illustrated embodiment of FIG. 2 the weight values stored in the weight storage sections 216 and 220 each comprise four sections $A_0$–$A_3$ and $B_0$–$B_3$ that are 6 bits wide. Therefore, the output value signal supplied on the lines 222 and 224 is 24 bits wide. The $\overline{A}$ weight values are supplied on the lines 226 to the multiplexer 228 while the $\overline{B}$ weights are supplied on the lines 230 to the same multiplexer. The output of the multiplexer to the 228 is supplied on the lines 232 to be utilized by the uppermost correction logic circuit 200 of FIG. 2. The other correction logic circuits and multiplexers are connected to function in a similar manner.

Figure 3:
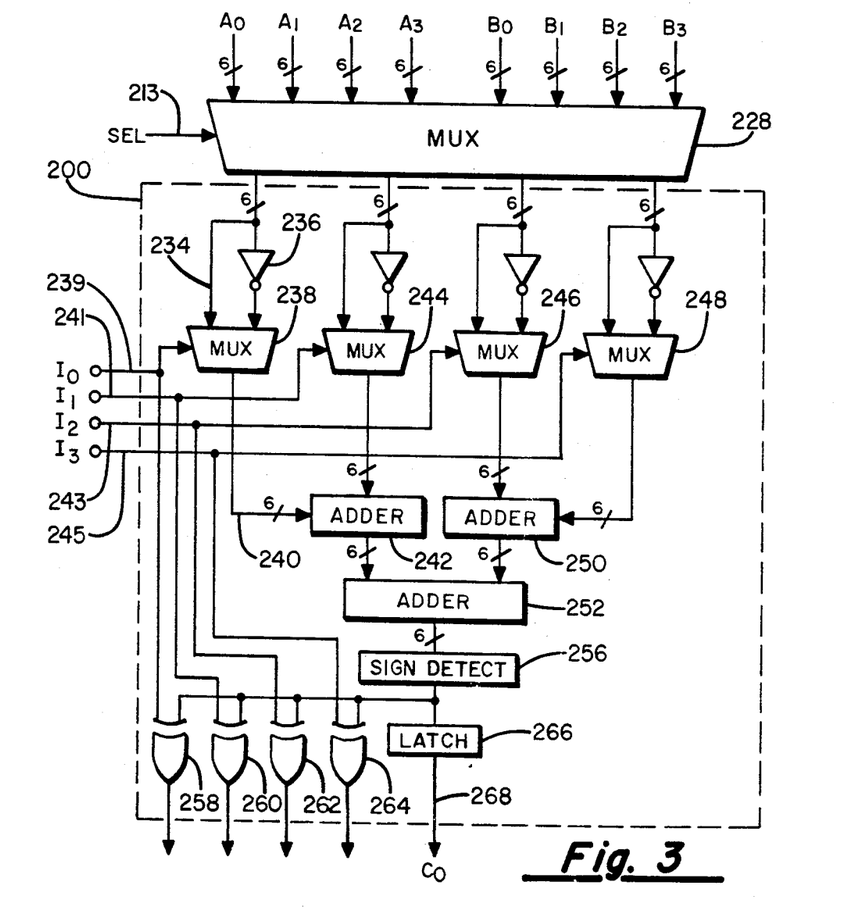
FIG. 3 illustrates in further detail the operation of a correction logic circuit as shown and described with reference to FIG. 2.

FIG. 3 illustrates in further detail the operation of a correction logic circuit as shown and described with reference to FIG. 2. For example, the $\overline{A}$ and $\overline{B}$ weight signals supplied to the multiplexer 228 are controlled by the signal on the selection line 213 and the outputs of the multiplexer 228 are coupled directly on input lines, such as the line 234, or through an inverter such as an inverter 236, to the multiplexer 238. The input signals $I_0$–$I_3$ on the lines 239–245 control the selection of the multiplexers in the manner described above so that the actual value of the selected weights, such as the weight $A_0$, appears on the line 234 and the inverted value of this weight appears at the output of the inverter 236, while the input signals select the appropriate input. Thus, if the signal on the line 239 is at a logic "1" level, the value of the weight $A_0$ will be supplied to the multiplexer as a six bit signal on the lines 240 to the adder 242. If the signal on the line 239 is at a logic "0" level, the value of the weight $B_0$ will be supplied on the lines 240 to the adder 242.

The output of the multiplexer 244 is also supplied to this adder, while the outputs of the multiplexers 246 and 248 are supplied to the adder 250. The output of both of the adders 242 and 250 are supplied to the adder 252 and a six bit wide signal is sent to the sign detector circuit 256. The sign detect circuit 256 is connected to a series of exclusive-or gates 258–264 and a latch 266. The output of the latch 266 on the line 268 is the $C_0$ signal while the outputs of the exclusive-or gates 258–264 are coupled to the lines 204 or FIG. 2.

Figure 4:
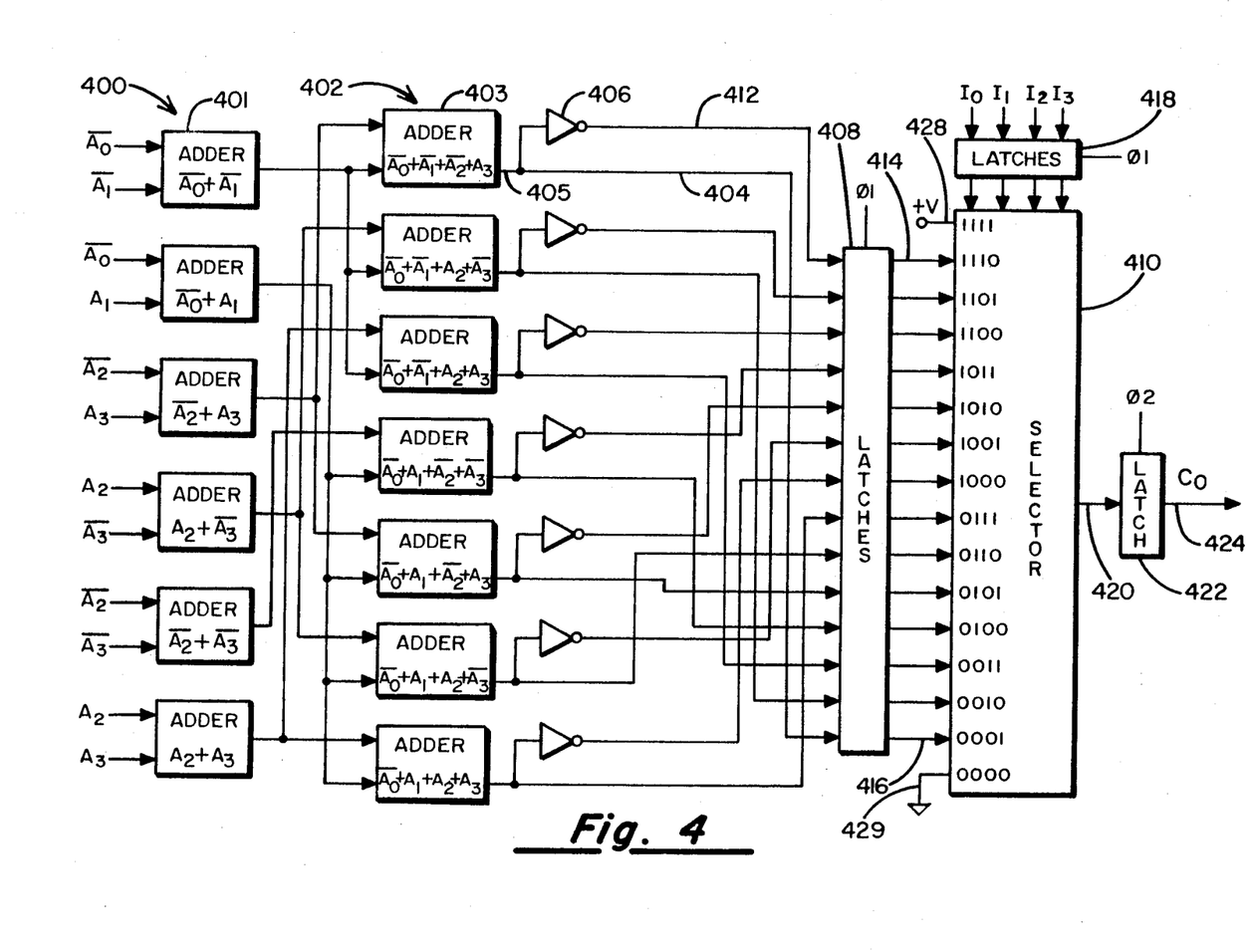
FIG. 4 illustrates a further improvement of the present invention.

FIG. 4 illustrates a further improvement of the present invention, in which all possible comparisons of the weight counts that are utilized are precalculated so that when the input path sources record their votes the result of the weighted vote comparison will be immediately accessible at the output of the selection. This will cause a feedback signal indicating agreement or disagreement to be sent to each of the data sources. This embodiment utilizes a number of different weight counts and their inverted values, for example the weights $A_0$, $A_1$, $A_2$ and $A_3$ and their inverted, or bit-by-bit complemented values are coupled to a series of adders 400. The first series of adders 400 are coupled in turn to a second series of adders 402. Each of the first series of adders 400 has two weighted values coupled to it in a permuted fashion. The six adders of the row of adders 400 are connected so that each of the seven adders of the row 402 have two inputs. The combinations that are supplied are indicated by the lettering in the boxes of each of the adders where a bar above the input signal indicates the complement of the number. The adders 402 all have sign detection circuits similar to the sign detection circuits of FIG. 1b and the output of these sign detection circuits are the outputs of the adders 402.

The outputs of the adders 402 are each supplied both on a direct line such as the line 404 and through an inverter, such as the inverter 406, to the latches 408. The latches 408 are clocked by clock phase one and supply their outputs to a one of sixteen selector 410. For example, the output of the inverter 406 on the line 412 is supplied by the latch 408 as an input to the selector 410 on the line 414. The signal on the line 414 is a selection signal that is designated as "1110" next to the line 414 and is developed in the following manner. The $\overline{A}_0$ weight and $\overline{A}_1$ weight signals are coupled to the adder 401 which supplies a signal which is the sum of the $\overline{A}_0$ and $\overline{A}_1$ weight signals. The adders, such as the adder 403 of the row of adders 402, each receive the sum of two different adders of the row of adders 400 and produce a summation of four separate weight values. The adder 403, in addition to being an adder that sums the weighted values $\overline{A}_0$, $\overline{A}_1$, $\overline{A}_2$ and $A_3$, has a sign detect circuit included in it which is similar to the sign detect circuit 93 of FIG. 1b. Thus, the output of the adder 403 will be a logic level signal that will be supplied as a logic level signal on the line 405, or as the inverse of this logic level signal on the line 406. All of the other signals are developed in a similar manner in accordance with the inputs applied and the additions performed, as indicated by FIG. 4.

When all of the signals $I_0$–$I_3$ are at a high or logic "1" level a "1111" value is stored in the latches 418 and in this instance the positive voltage supply connected to the line 426 will be selected in order to send a logic "1" level signal to the output line 420 regardless of the values of the weight signals values inputted to the address 400. When all of the input signals $I_0$–$I_3$ are at a "0" logic level, a "0000" value is represented and in this instance a ground level, or logic "0" signal is connected to the line 428, by the selector 410, regardless of the weighted values.

In the two immediately described instances relating to the selection of lines 426, and 428 all of the input signals $I_0$–$I_3$ were in agreement. When there is disagreement, the value on the line 420 from the selector 410 is dependent on the values bothered from the adders 402.

If the output of the adder 403, for example, signifies that greater than the sum of $\overline{A}_0 + \overline{A}_1 + \overline{A}_2 + A_3$ is greater than zero, and then the line 404 will be at a logic "0" level and the line 412 will be at a logic "138 level due to the inversion by the inverter 406. On the other hand, if $\overline{A}_0 + \overline{A}_1 + \overline{A}_2 + A_3$ is equal to or less than zero, the output of the adder 403 will be a logic "1" level and the signal on the line 412 will be at a "0" logic level while the signal on the line 404 will be at a logic "1" level.

The signals $I_0$–$I_3$ supplied to the latches 418 determine a selection signal that selects one of the input lines to the selector 410 from the latches 408 (for example, the lines 414, 416, 426, 428). When the input signals $I_0$, $I_1$, $I_2$ are all at a logic "1" level and $I_3$ is at a logic "0" level, for example, the line 414 is selected. The signal on the line 414 follows the signal on the line 404. If the weight values $\overline{A}_0 + \overline{A}_1 + \overline{A}_2 + A_3$ is greater than zero, the signal on the line 404, which is passed on the line 414 through the selector 410 to the line 420, will be at a logic "1" level. If $\overline{A}_0 + \overline{A}_1 + \overline{A}_2 + A_3$ is equal to or less than zero, the signal on the line 404 will be at a logic "0" level. The output on the line 420 is fed to the latch 422 and supplied as the $C_0$ signal, at the "correct" signal on the line 424 back to the data sources.

Although the invention has been described with reference to particular embodiments, it is understood that numerous other embodiments may be readily devised by those skilled in the art by utilizing the teachings of the present invention. The signal on line 416 is represented when as "0001" there is a match between the input signals $I_0$–$I_4$ which are stored in the latches 418, that are clocked by a phase one clock and the selected binary value, (for example, "0001", when line 416 is activated, or "1110", when line 414 is activated) a logic "1" input signal will appear on the line 420 to the latch 422. Otherwise, in the absence of a match line 420 will be at a logic level "0". The latch 422 is clocked by clock phase two to supply its $C_0$ signal on the line 424, which may be utilized by the system in the manner previously described, such as by coupling the line 424 to exclusive-or gates 96, 108, 110 and 112 of FIGS. 1a and 1b in order to increment or decrement stored weight counts. It will also be recognized that the employment of alternate A and B weight values with the embodiment of FIG. 4 is a modification that is intended to be included within the scope of the present invention.

What is claimed is:

1. A digital system employing adaptive voting comprising;
   input means for supplying an input data bit from each of a plurality of input devices, weight means for storing an initial plurality of weight values, each of which values is associated with one of said input devices, voting means coupled to said input means and to said weight means for utilizing said input data bits and said weight values for determining which of said input data bits correspond to at least one correct data output bit and for providing said data output bit and weight adjustment means coupled to said input means and said voting means for adjusting said stored weight values by selectively increasing the weight values associated with a given input device as a function of matches between the input data bit from said given input device and said output data bit and by selectively decreasing the weight value associated with a given input device as a function of mismatches between the input data bit from said given input device and said output data bit.

2. A digital system as claimed in claim 1 wherein said voting means comprises an up/down counter, the count direction of which is controlled by the occurrence of either a match or a mismatch between the associated input data bit and the output data bit and which supplies both positive and negative weight values, and multiplexing means coupled to select either said positive or negative weight values in accordance with the value of the associated input data bit, and
   wherein said system further comprises calculation means coupled to all of said multiplexing means which receives said positive or negative weight values and derives the correct output data bit therefrom.

3. A digital system as claimed in claim 2 wherein said calculation means comprises calculation means for calculating said weight values prior to the receipt of associated input data bits by said input means to determine a plurality of weighted vote value combinations and selection means coupled to said calculation means and to receive said input data bits for selecting said correct output data bit in accordance with said weighted vote values combinations and said input data bits following the receipt of associated input data bits.

4. A digital system as claimed in claim 3, wherein said system further comprises an alternate weight means for storing a second plurality of weight values and weight value control means constructed to selectively supply either said weight values of said weight means or said weight values of said alternate weight means to said voting means.

5. A digital system as claimed in claim 4 wherein weight values are increased as a function of matches and are decreased as a function of mismatches at different rates.

6. A digital system as claimed in claim 5 wherein each increase of said weight values requires a greater number of matches than each decrease of said weight values.

7. A digital system as claimed in claim 6 wherein said weight values are increased only after a multiple number of matches occur in a row while said weight values are decreased upon each mismatch.

8. A digital system as claimed in claim 1 wherein a plurality of output data bits are provided by said voting means.

9. A digital system as claimed in claim 8 wherein weight values are increased as a function of matches and are decreased as a function of mismatches at different rates.

10. A digital system as claimed in claim 9 wherein each increase of said weight values requires a greater number of matches than each decrease of said weight values.

11. A digital system as claimed in claim 10 wherein said weight values are increased only after a multiple number of matches occur in a row while said weight values are decreased upon each mismatch.

12. A digital system as claimed in claim 1, wherein said system further comprises an alternate weight means for storing a second plurality of weight values and weight value control means constructed to selectively supply either said weight values or said weight means or said weight values of said alternate weight means to said voting means.

13. A digital system as claimed in claim 12 wherein weight values are increased as a function of matches and are decreased as a function of mismatches at different rates.

14. A digital system as claimed in claim 13 wherein each increase of said weight values requires a greater number of matches than each decrease of said weight values.

15. A digital system as claimed in claim 14 wherein said weight values are increased only after a multiple number of matches occur in a row while said weight values are decreased upon each mismatch.

16. A digital system as claimed in claim 1 wherein weight values are increased as a function of matches and are decreased as a function of mismatches at different rates.

17. A digital system as claimed in claim 16 wherein each increase of said weight values requires a greater number of matches than each decrease of said weight values.

18. A digital system as claimed in claim 17 wherein said weight values are increased only after a multiple number of matches occur in a row while said weight values are decreased upon each mismatch.

19. A method of providing fault-tolerant adaptive voting for a plurality of input sources utilizing initialized vote weight values and input data signals to determine a correct output signal from such input data signals, comprising adjusting said initialized weight values by selectively decreasing the weight value associated with an input device away from said initialized weight value when said input device inputs an input signal that does not agree with a voted-in associated output signal and selectively increasing the weight value associated with said input device toward said initialized weight value when said input device inputs an input signal that does agree with said associated voted-on output signal, and producing said correct associated voted-on output signal.

20. A method as claimed in claim 19 comprising the step of decreasing said weight values upon each disagreement of said input signal and said voted-on output signal, and said step of increasing said weight values associated with said input device occurs only after a multiple number of agreements of said input signal and said voted-on output signal have occurred.

* * * * *

UNITED STATES PATENT AND TRADEMARK OFFICE
CERTIFICATE OF CORRECTION

PATENT NO. : 4,723,242
DATED : 2/2/88
INVENTOR(S) : Brian R. Larson, Donald B. Bennett, Thomas O Wolff It is certified that error appears in the above-identified patent and that said Letters Patent is hereby corrected as shown below:

Column 10, line 9, "voted-in" should be -- voted-on -- .

Signed and Sealed this

Twenty-eighth Day of August, 1990

Attest:

HARRY F. MANBECK, JR.

*Attesting Officer*  *Commissioner of Patents and Trademarks*